US010633025B2

(12) United States Patent
McGill et al.

(10) Patent No.: US 10,633,025 B2
(45) Date of Patent: Apr. 28, 2020

(54) SYSTEMS AND METHODS FOR SWITCHING BETWEEN A DRIVER MODE AND AN AUTONOMOUS DRIVING MODE FOR A VEHICLE

(71) Applicant: Toyota Research Institute, Inc., Los Altos, CA (US)

(72) Inventors: Stephen McGill, Broomall, PA (US); Luke Fletcher, Cambridge, MA (US); Kazunori Nimura, Novi, MI (US); John Leonard, Newton, MA (US); Gill Pratt, Los Altos, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 9 days.

(21) Appl. No.: 15/877,488

(22) Filed: Jan. 23, 2018

(65) Prior Publication Data

US 2019/0092389 A1 Mar. 28, 2019

Related U.S. Application Data

(60) Provisional application No. 62/563,405, filed on Sep. 26, 2017, provisional application No. 62/563,677, filed on Sep. 27, 2017.

(51) Int. Cl.
*B62D 15/02* (2006.01)
*B62D 1/02* (2006.01)
(Continued)

(52) U.S. Cl.
CPC .............. *B62D 15/025* (2013.01); *B60T 7/22* (2013.01); *B60T 8/17* (2013.01); *B60W 50/14* (2013.01);
(Continued)

(58) Field of Classification Search
CPC . B62D 15/10; B62D 5/00; B62D 6/00; B62D 15/02; B60W 50/10; B60W 30/12; B60W 30/045; B60D 1/22
See application file for complete search history.

(56) References Cited

U.S. PATENT DOCUMENTS

| 4,726,441 A * | 2/1988 | Conley | G05G 1/34 |
| | | | 180/322 |
| 4,834,205 A * | 5/1989 | Mizuno | B62D 5/061 |
| | | | 180/422 |

(Continued)

FOREIGN PATENT DOCUMENTS

| CN | 106184717 A | 12/2016 |
| DE | 102013113628 A1 | 9/2017 |

*Primary Examiner* — Yuri Kan
(74) *Attorney, Agent, or Firm* — Dinsmore & Shohl LLP

(57) ABSTRACT

A vehicle system for operating a vehicle is provided. The vehicle system includes a first output device configured to output a first output, and a second output device configured to output a second output. The vehicle system operates the vehicle based on the first output from the first output device while obtaining vehicle environment information, determines whether an autonomous take-over event occurs based on the vehicle environment information, operates the vehicle in an autonomous driving mode in response to determining that the autonomous takeover event occurred, determines whether the vehicle system receives a take-over signal from the second output device, and operates the vehicle based on the second output from the second output device in response to determining that the vehicle system received the take-over signal from the second output device.

20 Claims, 10 Drawing Sheets

(51) Int. Cl.
    *B60W 30/12*     (2020.01)
    *G05D 1/00*     (2006.01)
    *B60W 50/14*     (2020.01)
    *B62D 1/28*     (2006.01)
    *B62D 1/22*     (2006.01)
    *B62D 5/00*     (2006.01)
    *B60T 7/22*     (2006.01)
    *B60T 8/17*     (2006.01)
    *B60W 10/20*     (2006.01)
    *G01S 13/931*     (2020.01)
    *B60T 7/04*     (2006.01)

(52) U.S. Cl.
    CPC ............... *B62D 1/22* (2013.01); *B62D 1/286* (2013.01); *B62D 5/006* (2013.01); *B62D 15/021* (2013.01); *G05D 1/0061* (2013.01); *G05D 1/0088* (2013.01); *B60T 7/042* (2013.01); *B60T 2201/022* (2013.01); *B60T 2210/32* (2013.01); *B60T 2260/02* (2013.01); *B60T 2270/82* (2013.01); *B60W 10/20* (2013.01); *B60W 2540/18* (2013.01); *G01S 13/931* (2013.01); *G05D 2201/0213* (2013.01)

(56) References Cited

U.S. PATENT DOCUMENTS

| | | | |
|---|---|---|---|
| 5,845,724 A | * | 12/1998 | Barrett .................. A63H 17/38 |
| | | | 180/65.1 |
| 6,459,228 B1 | | 10/2002 | Szulyk et al. |
| 8,695,750 B1 | * | 4/2014 | Hammond ............... B62D 5/06 |
| | | | 180/403 |
| 8,994,521 B2 | | 3/2015 | Gazit |
| 9,342,074 B2 | | 5/2016 | Dolgov et al. |
| 9,352,824 B2 | | 5/2016 | Piotrowski et al. |
| 9,499,202 B2 | | 11/2016 | Lewis et al. |
| 9,690,291 B2 | | 6/2017 | Ouellette et al. |
| 2003/0146040 A1 | | 8/2003 | Dybalski et al. |
| 2011/0251739 A1 | | 10/2011 | Tomas et al. |
| 2013/0041545 A1 | * | 2/2013 | Bar .................... B60G 17/0162 |
| | | | 701/23 |
| 2016/0325758 A1 | | 11/2016 | Huang |
| 2017/0057542 A1 | | 3/2017 | Kim et al. |
| 2017/0073000 A1 | * | 3/2017 | Numazaki ................ B62D 1/04 |
| 2017/0096164 A1 | * | 4/2017 | Sun ........................ B62D 1/28 |
| 2017/0166221 A1 | * | 6/2017 | Osterman .............. A63G 25/00 |
| 2017/0203788 A1 | | 7/2017 | Heo |
| 2018/0354513 A1 | * | 12/2018 | Moshchuk ............ B60W 10/20 |

\* cited by examiner

SYSTEMS AND METHODS FOR SWITCHING BETWEEN A DRIVER MODE AND AN AUTONOMOUS DRIVING MODE FOR A VEHICLE

CROSS-REFERENCE TO RELATED APPLICATIONS

This application claims the benefit of U.S. Provisional Patent Application No. 62/563,405 filed on Sep. 26, 2017, and U.S. Provisional Patent Application No. 62/563,677 filed on Sep. 27, 2017, the entire contents of which are herein incorporated by reference.

TECHNICAL FIELD

Embodiments described herein generally relate to systems and methods for switching between a driver mode and an autonomous mode for a vehicle and, more specifically, to systems and methods for switching between a driver mode and autonomous mode based on the occurrence of autonomous take-over events.

BACKGROUND

Drivers who lack skills or experience may drive vehicles in an improper manner. For example, the drivers may not readily recognize conditions, (such as obstacles at a blind spot) and may fail to adequately navigate the conditions. As another example, drivers may not follow an optimal trajectory on a road under a current driving situation and choose to follow a sub-optimal path.

Accordingly, a vehicle system that helps drivers to drive in an optimal manner is needed.

SUMMARY

In one embodiment, the vehicle system includes a first output device configured to output a first output based on an input from a first user, and a second output device configured to output a second output based on an input from a second user. The vehicle system also includes one or more processors, one or more memory modules communicatively coupled to the one or more processors, and machine readable instructions stored in the one or more memory modules that, when executed by the one or more processors, cause the vehicle system to operate a vehicle based on the first output from the first output device while obtaining vehicle environment information, determine whether an autonomous take-over event occurs based on the vehicle environment information, operate the vehicle in an autonomous driving mode in response to determining that the autonomous take-over event occurred, determine whether the vehicle system receives a take-over signal from the second output device, and operate the vehicle based on the second output from the second output device in response to determining that the vehicle system received the take-over signal from the second output device.

In another embodiment, a vehicle system includes a first steering wheel configured to output a first output based on an input from a first user. The vehicle system includes one or more processors, one or more memory modules communicatively coupled to the one or more processors, and machine readable instructions stored in the one or more memory modules that cause the vehicle system to perform at least the following when executed by the one or more processors: operate a vehicle based on the first output from the first steering wheel while obtaining vehicle environment information, determine a target trajectory for the vehicle based on the vehicle environment information, determine a difference between an actual path of the vehicle and the target trajectory for the vehicle, and provide a feedback through a feedback device based on the difference.

In another embodiment, a vehicle system includes a steering wheel configured to output an output based on an input from a user, one or more processors, one or more memory modules communicatively coupled to the one or more processors, and machine readable instructions stored in the one or more memory modules that cause the vehicle system to perform at least the following when executed by the one or more processors: control an orientation of front wheels of a vehicle based on the output from the steering wheel while obtaining vehicle environment information, determine a target orientation of front wheels based on the vehicle environment information, determine whether the orientation of the front wheels of the vehicle deviates from the target orientation, adjust the orientation of the front wheels to the target orientation while the steering wheel is disengaged from the front wheels, provide a feedback in response to adjusting the orientation of the front wheels to the target orientation, and rotate the steering wheel to align with the front wheels.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include vehicle systems for operating vehicles in different modes including a driver mode and an autonomous driving mode. The vehicle system includes a first output device configured to output a first output based on an input from a first user, a second output device configured to output a second output based on an input from a second user. The vehicle system includes one or more processors, one or more memory modules communicatively coupled to the one or more processors, and machine readable instructions stored in the one or more memory modules that, when executed by the one or more processors, cause the vehicle system to operate a vehicle based on the first output from the first output device while obtaining vehicle environment information, determine whether an autonomous take-over event occurs based on the vehicle environment information, operate the vehicle in an autonomous driving mode in response to determining that the autonomous takeover event occurred, determine whether the vehicle system receives a take-over signal from the second output device, and operate the vehicle based on the second output from the second output device in response to determining that the vehicle system received the take-over signal from the second output device. The vehicle systems for operating vehicles in different modes including a driver mode and an autonomous driving mode will be described in more detail herein with specific reference to the corresponding drawings.

Figure 1A:
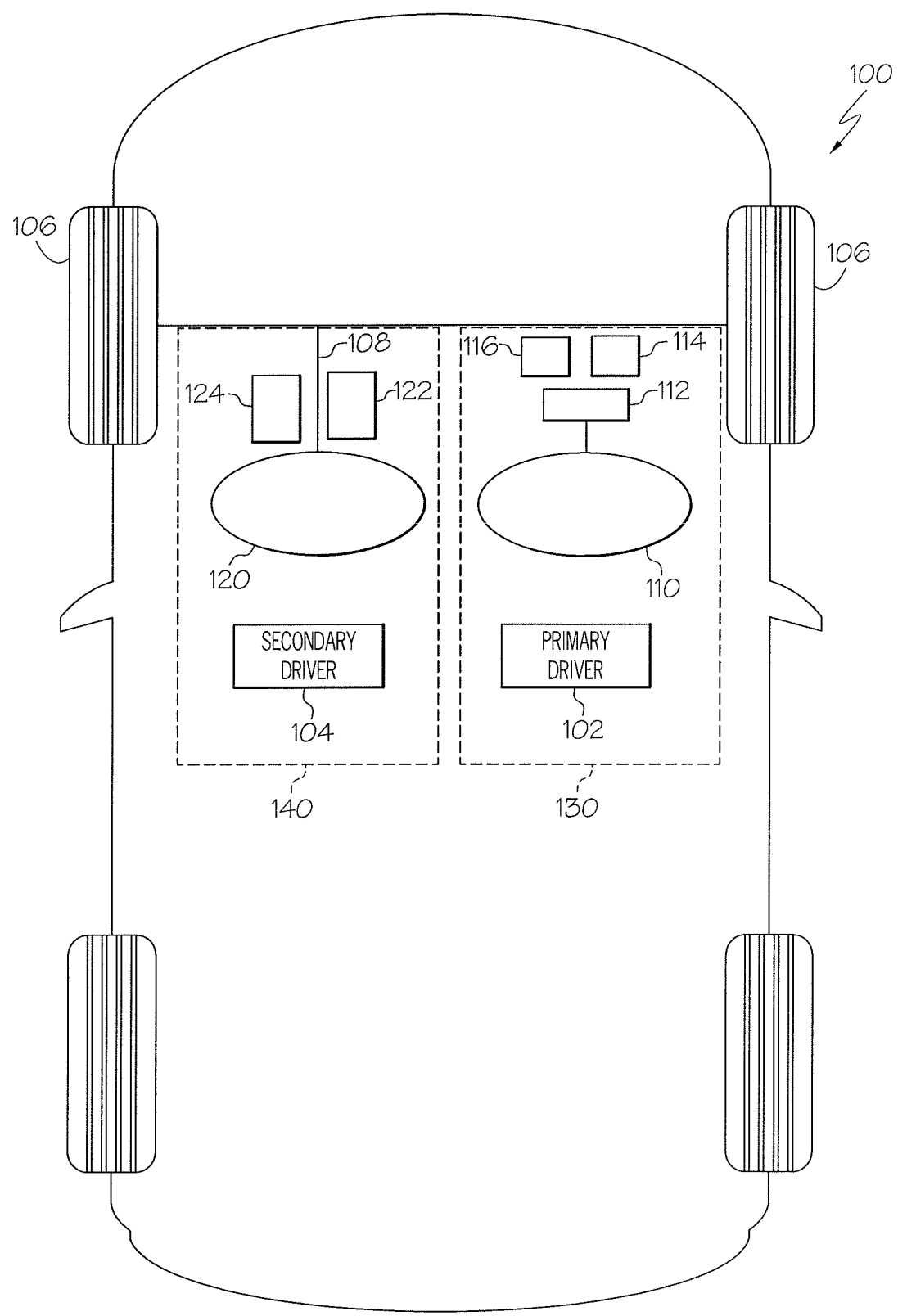
FIG. 1A schematically depicts a vehicle having a dual cockpit system according to one or more embodiments shown and described herein.

FIG. 1A schematically depicts a vehicle 100 having a dual cockpit system according to one or more embodiments shown and described herein. The vehicle 100 may be an automobile or any other passenger or non-passenger vehicle such as, for example, a terrestrial, aquatic, and/or airborne vehicle. In some embodiments, the vehicle 100 is an autonomous vehicle that navigates its environment with limited human input or without human input.

The vehicle 100 includes a dual cockpit system including a first cockpit 130 for a primary driver 102 and a second cockpit 140 for a secondary driver 104. In embodiments, the first cockpit 130 includes a first steering wheel 110, a first accelerator pedal 114, and a first brake pedal 116. The second cockpit 140 includes a second steering wheel 120, a second accelerator pedal 122, and a second brake pedal 124.

In embodiments, the first steering wheel 110 may operate according to a drive-by-wire mechanism. For example, in some embodiments, the first steering wheel 110 is electrically or electro-mechanically connected to a vehicle system. The first steering wheel 110 is connected to a steering wheel interface module 112 that sends out steering signals dependent on the steering wheel position to other components of the vehicle, e.g., a steering electronic control unit (ECU). The second steering wheel 120 may be mechanically linked to the front wheels 106 through a linkage 108. In some embodiments, both the first steering wheel 110 and the second steering wheel 120 may operate according to the drive-by-wire mechanism. In some embodiments, both the first steering wheel 110 and the second steering wheel 120 may be mechanically linked to the front wheels 106. While FIG. 1A depicts that the first cockpit 130 is on the right side of the vehicle 100 and the second cockpit 140 is on the left side of the vehicle 100, in some embodiments, the first cockpit 130 may be on the left side of the vehicle 100 and the second cockpit 140 may be on the right side of the vehicle 100

In embodiments, the first accelerator pedal 114 may operate according to a drive-by-wire mechanism. For example, in some embodiments, the first accelerator pedal 114 is electrically or electro-mechanically connected to a vehicle system to send electrical signals indicative of a position of the first accelerator pedal 114 to an accelerator ECU. The second accelerator pedal 122 may also operate according to a drive-by-wire mechanism.

In embodiments, the first brake pedal 116 may operate according to a drive-by-wire mechanism. For example, in some embodiments, the first brake pedal 116 is electrically or electro-mechanically connected to a vehicle system to send electrical signals indicative of a position of the first brake pedal 116 to a brake ECU. The second brake pedal 124 may be mechanically linked to the brakes of the vehicle 100. In some embodiments, both the first brake pedal 116 and the second brake pedal 124 may operate according to the drive-by-wire mechanism.

In embodiments, the vehicle 100 may operate under three operational modes. The first mode is a primary driver mode where the vehicle 100 is operated by the primary driver 102 manipulating the first steering wheel 110, the first accelerator pedal 114, and/or the first brake pedal 116. The second mode is an autonomous driving mode where the vehicle operates autonomously under the control of an autonomous controller of the vehicle 100. The third mode is a secondary driver mode where the vehicle 100 is operated by the secondary driver 104 manipulating the second steering wheel 120, the second accelerator pedal 122, and the second brake pedal 124. In some embodiments, during the autonomous driving mode, only some of the vehicle functions may operate autonomously. For example, steering of the vehicle 100 may operate autonomously while an acceleration or declaration of the vehicle 100 may be controlled by the primary driver 102 who presses upon the first accelerator pedal 114 or the first brake pedal 116 to accelerate or brake. The operation mode of the vehicle 100 may switch among the primary driver mode, the autonomous driving mode, and the secondary mode. Details of the modes and the operation of switching among the modes will be described further below.

Figure 1B:
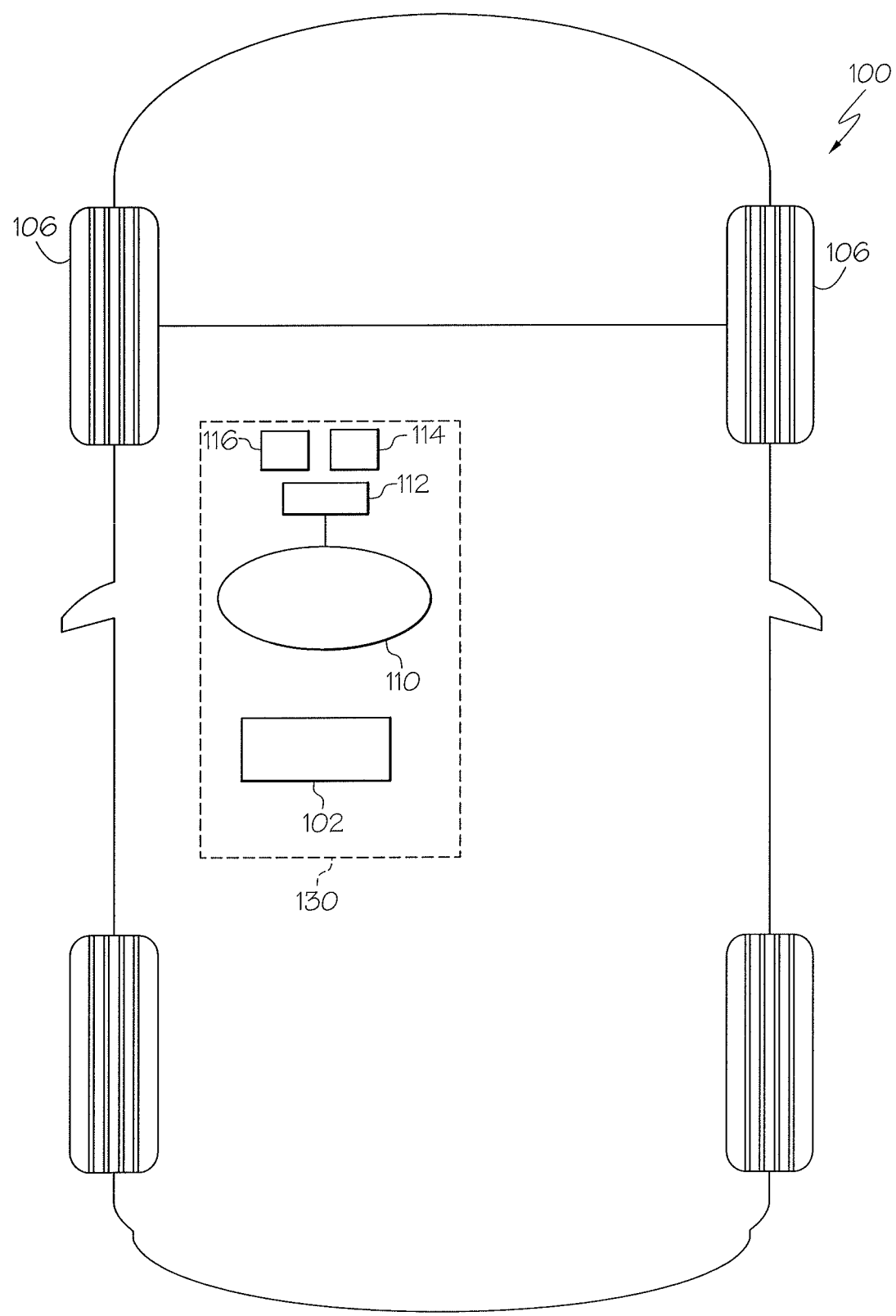
FIG. 1B schematically depicts a vehicle having a single cockpit system according to one or more embodiments shown and described herein.

While the above description discussed a dual-cockpit system with reference to FIG. 1A, in some embodiments the vehicle 100 may include only the first cockpit 130 as shown in FIG. 1B. In some embodiments, the vehicle 100 switches between the primary driver mode and the autonomous driving mode. The first cockpit 130 may be on either the left side or the right side of the vehicle 100.

Figure 2:
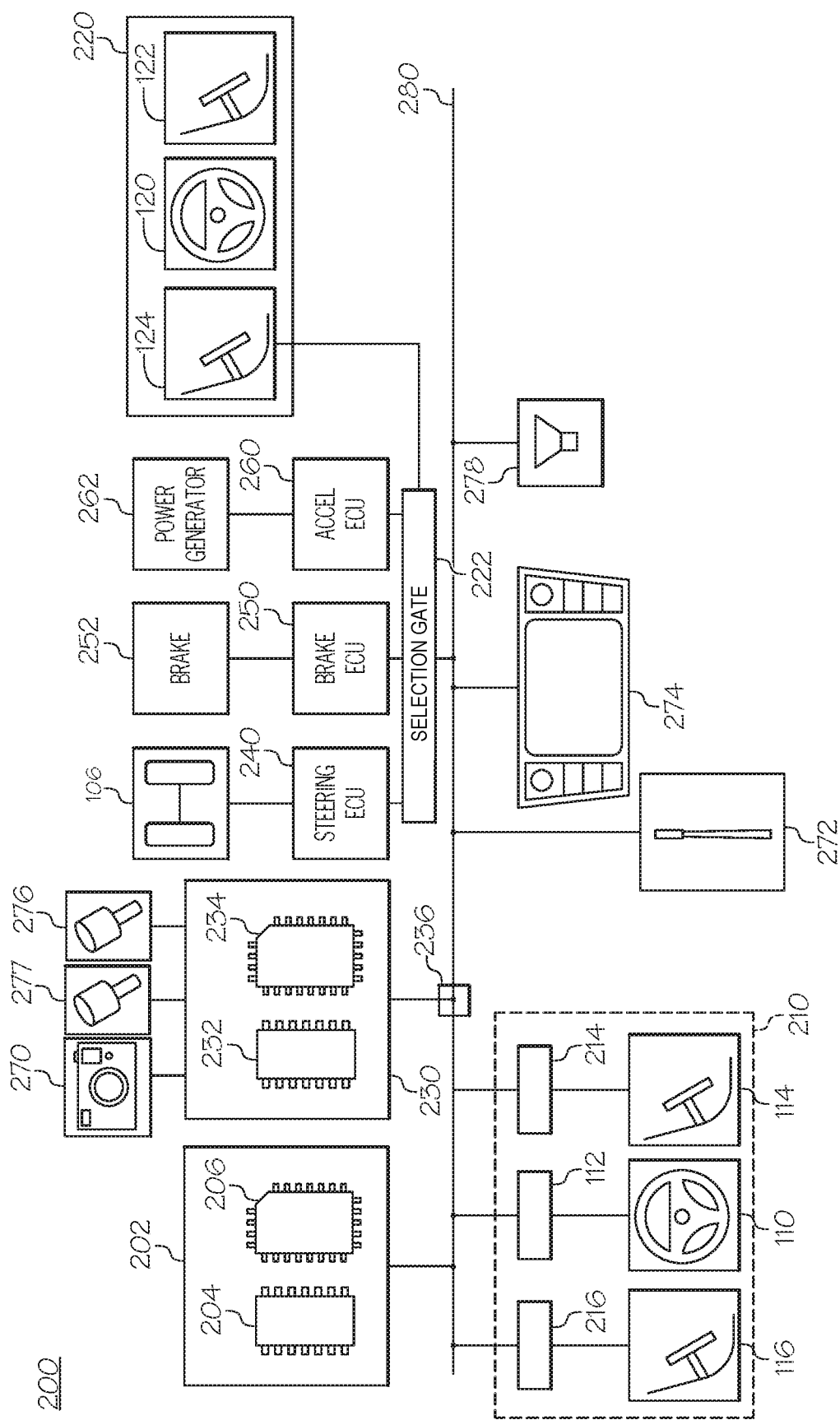
FIG. 2 schematically depicts a vehicle system for switching driving modes, according to one or more embodiments shown and described herein.

FIG. 2 schematically depicts a vehicle system 200 for switching driving modes, according to one or more embodiments shown and described herein. The vehicle system 200 includes a controller 202 that includes one or more processors 204 and one or more memory modules 206. Each of the one or more processors 204 may be any device capable of executing machine readable and executable instructions. Accordingly, each of the one or more processors 204 may be a controller, an integrated circuit, a microchip, a computer, or any other computing device. The one or more processors 204 are coupled to a communication path 280 that provides signal interconnectivity between various modules of the vehicle system 200. Accordingly, the communication path 280 may communicatively couple any number of processors 204 with one another, and allow the modules coupled to the communication path 280 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 280 may be formed from any medium that is capable of transmitting a signal such as, for example, conductive wires, conductive traces, optical waveguides, or the like. In some embodiments, the communication path 280 may facilitate the transmission of wireless signals, such as Wi-Fi, Bluetooth, Near Field Communication (NFC) and the like. Moreover, the communication path 280 may be formed from a combination of mediums capable of transmitting signals. In one embodiment, the communication path 280 comprises a combination of conductive traces, conductive wires, connectors, and buses that cooperate to permit the transmission of electrical data signals to components such as processors, memories, sensors, input devices, output devices, and communication devices. Accordingly, the communication path 280 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The one or more memory modules 206 are coupled to the communication path 280. The one or more memory modules 206 may comprise RAM, ROM, flash memories, hard drives, or any device capable of storing machine readable and executable instructions such that the machine readable and executable instructions can be accessed by the one or more processors 204. The machine readable and executable instructions may comprise logic or algorithm(s) written in any programming language of any generation (e.g., 1 GL, 2 GL, 3 GL, 4 GL, or 5 GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 2, the vehicle system 200 includes a primary driver system 210. The primary driver system includes the first steering wheel 110, the first accelerator pedal 114, and the first brake pedal 116. The first steering wheel 110 is connected to the steering wheel interface module 112. The steering wheel interface module 112 is coupled to the communication path 280 and communicatively coupled to the controller 202. The steering wheel interface module 112 may be configured to detect a position of the first steering wheel 110 and output a steering control signal to a steering ECU 240 through the communication path 280. In some embodiments, the controller 202 may receive signals from the steering wheel interface module 112 and output a steering control signal to the steering ECU 240 through the communication path 280. The steering ECU 240 is configured to control the orientation of the front wheels 106 based on the steering control signal.

The steering wheel interface module 112 may include a steering wheel actuator that provides a force feedback and/or torque control (e.g., rotation of the first steering wheel 110, a vibration of the first steering wheel 110, etc.) to the primary driver 102. For example, if the primary driver 102 rotates the first steering wheel 110 clockwise by 90 degrees and the vehicle system 200 determines that the rotation of 90 degrees should be reduced to a rotation of 45 degrees, the steering wheel actuator may increase the resistance or stiffness of the rotation of the first steering wheel 110, or provide a torque in a direction opposite to the direction of torque provided by the primary driver 102.

The primary driver system 210 also includes an accelerator pedal interface unit 214. The accelerator pedal interface unit 214 may include an accelerator pedal position sensor and an accelerator pedal actuator. The accelerator pedal position sensor is configured to detect the position of the first accelerator pedal 114. The accelerator pedal actuator is configured to provide a force feedback (e.g., a vibration of the first accelerator pedal 114) to the primary driver 102. The accelerator pedal interface unit 214 is coupled to the communication path 280 and communicatively coupled to the controller 202. The accelerator pedal interface unit 214 may provide an acceleration control signal to an acceleration ECU 260 through the communication path 280. In some embodiments, the controller 202 may receive a signal from the accelerator pedal interface unit 214 and output an acceleration control signal to the acceleration ECU 260 through the communication path 280. The acceleration ECU 260 is electrically coupled to a power generator 262. The power generator 262 may include a combustion engine, a motor generator, and/or any other power generator that provides power to operate the vehicle 100. The accelerator pedal position sensor may be positioned proximate to the first accelerator pedal 114. The accelerator pedal position sensor detects a displacement of the first accelerator pedal 114 due to depress or release by the primary driver 102 and outputs an acceleration control signal based on the displacement value. In some embodiments, the first accelerator pedal 114 may be mechanically coupled to the power generator 262.

The primary driver system 210 also includes the first brake pedal 116 and a brake pedal interface module 216. The brake pedal interface module 216 is coupled to the communication path 280 and communicatively coupled to the controller 202. The brake pedal interface module 216 includes a brake pedal position sensor that may provide a brake control signal to a brake ECU 250 through the communication path 280. The brake ECU 250 controls the operation of the brake 252 of the vehicle 100 based on the brake control signal. The brake pedal position sensor detects a displacement of the first brake pedal 116 due to pressing or releasing by the primary driver 102 and outputs a brake control signal based on the displacement value. In some embodiments, the first brake pedal 116 may be mechanically coupled to the brake 252. The brake pedal interface module 216 may also include a brake pedal actuator that is configured to provide a force feedback (e.g., a vibration of the first brake pedal 116) to the primary driver 102.

The vehicle system 200 also includes an autonomous controller 230. The autonomous controller 230 includes one or more processors 232 and one or more memory modules 234. The one or more processors 232 may be similar to the one or more processors 204 as described above, and the one or more memory modules 234 may be similar to the one or more memory modules 206 as described above. In some embodiments, the vehicle system 200 may include a single controller combining the controller 202 and the autonomous controller 230. The autonomous controller 230 is coupled to the communication path 280 via an intervention switch 236. The intervention switch 236 may be a binary switch or a ramp up/down switch.

The intervention switch 236 may be controlled by the controller 202 and/or the autonomous controller 230. In embodiments, during the primary driver mode where the vehicle 100 is controlled by the primary driver 102, the intervention switch 236 connects the primary driver system 210 to the steering ECU 240, the brake ECU 250, and/or the acceleration ECU 260. When the controller 202 or the autonomous controller 230 determines that the vehicle system 200 needs to operate in an autonomous driving mode, the controller 202 or the autonomous controller 230 instructs the intervention switch 236 to connect the autonomous controller 230 with the steering ECU 240, the brake ECU 250, and/or the acceleration ECU 260 such that the autonomous controller 230 provides control signals to the steering ECU 240, the brake ECU 250, and/or the acceleration ECU 260. As such, the vehicle system 200 operates in the autonomous driving mode. During the autonomous driving mode, the signals from the primary driver system 210 may be disabled and may not be transferred to the steering ECU 240, the brake ECU 250, and the acceleration ECU 260.

In some embodiments, a combination of the autonomous controller 230 and the primary driver system 210 may provide control signals to the steering ECU 240, the brake ECU 250, and/or acceleration ECU 260. For example, the autonomous controller 230 may provide a steering control signal to the steering ECU 240, while the primary driver system 210 may provide an acceleration control signal and a brake control signal to the acceleration ECU 260 and the brake ECU 250.

The autonomous controller 230 is configured to monitor a vehicle environment based on outputs from various sensors. The vehicle system 200 includes one or more cameras 270, one or more proximity sensors 276, and one or more environment sensors 277.

The one or more cameras 270 may be any device having an array of sensing devices (e.g., pixels) capable of detecting radiation in an ultraviolet wavelength band, a visible light wavelength band, or an infrared wavelength band. The one or more cameras 270 may have any resolution. The one or more cameras 270 may include an omni-directional camera, or a panoramic camera. In some embodiments, one or more optical components, such as a mirror, fish-eye lens, or any other type of lens may be optically coupled to the one or more cameras 270. The one or more cameras 270 may include one or more cameras 270 within the vehicle 100 and one or more cameras 270 outside the vehicle.

The one or more cameras 270 within the vehicle 100 may capture images of the primary driver 102. The one or more memory modules 234 may include instructions for processing images received from one or more cameras 270. For example, the one or more processors 232 implement the instructions in the one or more memory modules 234 to process an image from the one or more cameras 270 to identify a facial expression of the primary driver 102. As another example, the one or more processors 232 implement the instructions in the one or more memory modules 234 to process an image from the one or more cameras 270 to identify a pose or an action of a vehicle occupant. Any image processing technology may be used to process images from the one or more cameras 270. Based on the identified facial expression, pose and/or the action, the autonomous controller 230 may determine whether or not to initiate the autonomous driving mode by sending a signal to the intervention switch 236. For example, if the identified facial expression indicates abnormal facial expression, e.g., an expression indicating being exhausted, surprised, or nervous, the autonomous controller 230 may initiate the autonomous driving mode by sending a signal to the intervention switch 236 to control the vehicle 100 with the autonomous controller 230 in an autonomous mode.

The one or more cameras 270 outside the vehicle 100 may capture an image of objects external to the vehicle. The one or more memory modules 234 may include instructions for processing images received from one or more cameras 270 outside the vehicle 100. For example, the one or more processors 232 implement the instructions in the one or more memory modules 234 to process an image from the one or more cameras 270 to identify any obstacles proximate to the vehicle 100. Based on the identified obstacles, the autonomous controller 230 may determine an optimal trajectory for the vehicle 100. Then, the autonomous controller 230 may determine whether or not to initiate the autonomous driving mode by comparing the optimal trajectory for the vehicle with an actual path of the vehicle 100. If the actual path of the vehicle 100 is substantially deviated from the optimal trajectory, the autonomous controller may initiate the autonomous driving mode by sending a signal to the intervention switch 236 and control the vehicle 100 with the autonomous controller 230 to follow the optimal trajectory in an autonomous mode.

The one or more proximity sensors 276 detect a distance between the one or more proximity sensors 276 and an object nearby and communicate the proximity information to the autonomous controller 230 of the vehicle system 200. The one or more proximity sensors 276 may be any device capable of outputting a proximity signal indicative of the proximity of an object to the one or more proximity sensors 276. In some embodiments, the one or more proximity sensors 276 may include laser scanners, capacitive displacement sensors, Doppler Effect sensors, eddy-current sensors, ultrasonic sensors, magnetic sensors, optical sensors, radar sensors, sonar sensors, LIDAR sensors or the like. Some embodiments may not include the one or more proximity sensors 276. In some embodiments, the vehicle system 200 may be configured to determine the presence of an obstacle proximate to the vehicle based on a signal from the one or more proximity sensors 276. Based on the identified obstacle, the autonomous controller 230 may determine an optimal trajectory for the vehicle 100. Then, the autonomous controller 230 may determine whether or not to initiate the autonomous driving mode by comparing the optimal trajectory for the vehicle with an actual path of the vehicle 100. If the actual path of the vehicle 100 substantially deviates from the optimal trajectory, the autonomous controller may initiate the autonomous driving mode by sending a signal to the intervention switch 236 and control the vehicle 100 to follow the optimal trajectory in an autonomous mode with the autonomous controller 230.

The one or more environment sensors 277 may include a temperature sensor for sensing a temperature outside the vehicle, a moisture sensor for sensing a humidity outside the vehicle, a fog detector sensor, etc. Based on outputs from the one or more environment sensors 277, the autonomous controller 230 may determine whether or not to initiate the autonomous driving mode. For example, if the autonomous controller 230 receives outputs from the fog detector sensor, the autonomous controller 230 may initiate the autonomous driving mode by sending a signal to the intervention switch 236 to operate in the autonomous mode. As another example, if the autonomous controller 230 receives outputs from the temperature sensor indicating the current temperature is below a certain temperature (e.g., 32 Fahrenheit degrees), the autonomous controller 230 may initiate the autonomous driving mode by sending a signal to the intervention switch 236 to operate in the autonomous mode.

In some embodiments, the autonomous controller 230 may monitor the speed of the vehicle 100, and initiate the autonomous driving mode by sending a signal to the intervention switch 236 to operate in the autonomous mode if the speed of the vehicle 100 substantially deviates from a target speed. For example, if the vehicle speed is 80 mph and the autonomous controller 230 identifies that the current speed limit is 60 mph (e.g., by capturing and processing a speed limit sign, retrieving pre-stored speed limit information from the one or more memory modules 234 or from a remote server), the autonomous controller 230 may initiate an autonomous driving mode and slow down the vehicle 100. As another example, if the vehicle speed is 40 mph and the autonomous controller 230 identifies that the vehicle 100 is driving on a highway (e.g., based on GPS information) and the current speed limit is 60 mph, the autonomous controller 230 may initiate an autonomous driving mode and speed up the vehicle 100.

In some embodiments, the autonomous controller 230 may determine route options between a current location and a destination, and retrieve traffic information for the route options. If the primary driver 102 operates the vehicle 100 to follow a heavy-traffic route, the autonomous controller 230 may initiate an autonomous driving mode and control the vehicle 100 to follow an alternative route with less traffic.

Referring still to FIG. 2, the vehicle system 200 includes a satellite antenna 272 coupled to the communication path 280 such that the communication path 280 communicatively couples the satellite antenna 272 to other modules of the vehicle system 200. The satellite antenna 272 is configured to receive signals from global positioning system satellites. Specifically, in one embodiment, the satellite antenna 272 includes one or more conductive elements that interact with electromagnetic signals transmitted by global positioning system satellites. The received signal is transformed into a data signal indicative of the location (e.g., latitude and longitude) of the satellite antenna 272 or an object positioned near the satellite antenna 272, by the one or more processors 204 and/or the one or more processors 232. In some embodiments, the vehicle system 200 does not include the satellite antenna 272.

Referring still to FIG. 2, the vehicle system 200 includes a screen 274 for providing visual output such as, for example, maps, navigation, entertainment, or a combination thereof. The screen 274 may be located on the head unit of the vehicle such that a driver of the vehicle may easily see the screen 274 while seated in the driver seat. The screen 274 may display a current drive mode of the vehicle 100, for example, the primary driver mode, the autonomous driving mode, the secondary driver mode. The communication path 280 communicatively couples the screen 274 to other modules of the vehicle system 200 including, without limitation, the controller 202 and the autonomous controller 230. The screen 274 may include any medium capable of transmitting an optical output such as, for example, a cathode ray tube, a light emitting diode (LED) display, an organic light emitting diode (OLED) display, a liquid crystal display, a plasma display, or the like.

The vehicle system 200 includes a speaker 278 coupled to the communication path 280 such that the communication path 280 communicatively couples the speaker 278 to other modules of the vehicle system 200. The speaker 278 transforms data signals from the vehicle system 200 into audible mechanical vibrations. The speaker 278 may provide information to an occupant of the vehicle system 200 about the current operation mode of the vehicle 100. For example, the speaker 278 may output a voice message e.g., "Autonomous driving mode is on," in response to the autonomous driving mode of the vehicle being initiated.

Still referring to FIG. 2, the vehicle system 200 includes a secondary driver system 220. The secondary driver system 220 includes the second steering wheel 120, the second accelerator pedal 122, and the second brake pedal 124. The secondary driver system 220 is coupled to the steering ECU 240, the brake ECU 250, and the acceleration ECU 260 via a selection gate 222. The selection gate 222 may receive control signals from the secondary driver system 220 and forward the control signals to the steering ECU 240, the brake ECU 250, and/or the acceleration ECU 260. When the selection gate 222 receives the control signals from the secondary driver system 220, the selection gate 222 may disable control signals from the autonomous controller 230 and/or the primary driver system 210. That is, the operation by the secondary driver has priority over the operation by the primary driver 102 or the operation in the autonomous driving mode.

Figure 3:
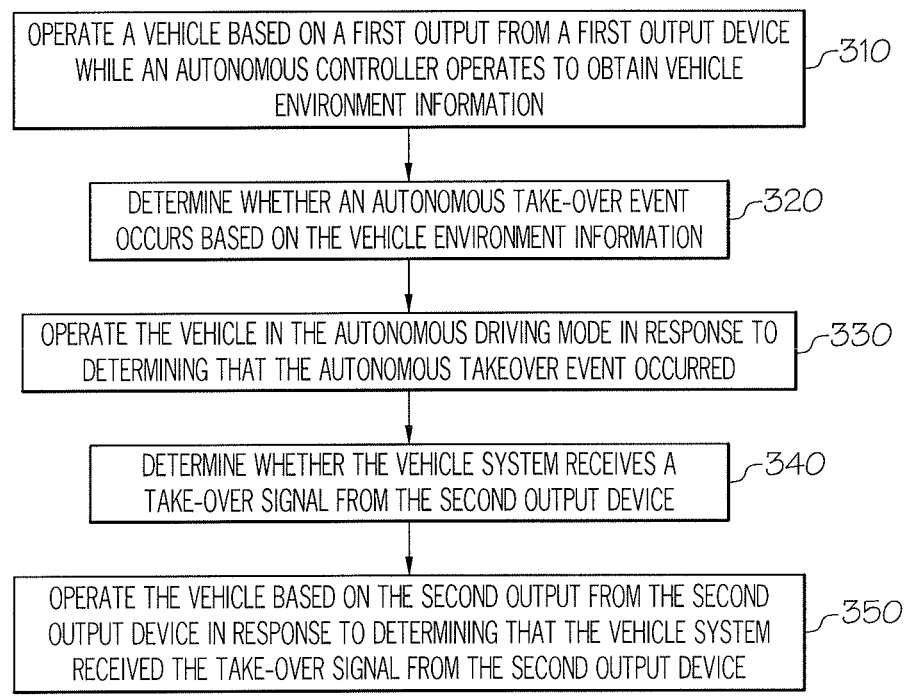
FIG. 3 depicts a flowchart for switching operation modes of a vehicle according to one or more embodiments shown and described herein.

FIG. 3 depicts a flowchart for switching operation modes of a vehicle according to one or more embodiments shown and described herein. In block 310, the vehicle system 200 operates the vehicle 100 based on a first output from a first output device while an autonomous controller operates to obtain vehicle environment information. In embodiments, the vehicle system 200 operates the vehicle 100 based on an output from the first steering wheel 110 while the autonomous controller 230 obtains vehicle environment information from various sensors including e.g., the one or more cameras 270, the one or more proximity sensors 276, and the one or more environment sensors 277. As such, the vehicle 100 operates in the primary driver mode. During the primary driver mode, while the vehicle 100 is controlled by the primary driver 102, the autonomous controller 230 obtains vehicle environment information and is ready to take the control over from the primary driver 102 when an autonomous take-over event occurs. In some embodiments, the vehicle system 200 may also operate the vehicle 100 based on an output from the first accelerator pedal 114 and/or the first brake pedal 116.

Figure 4:
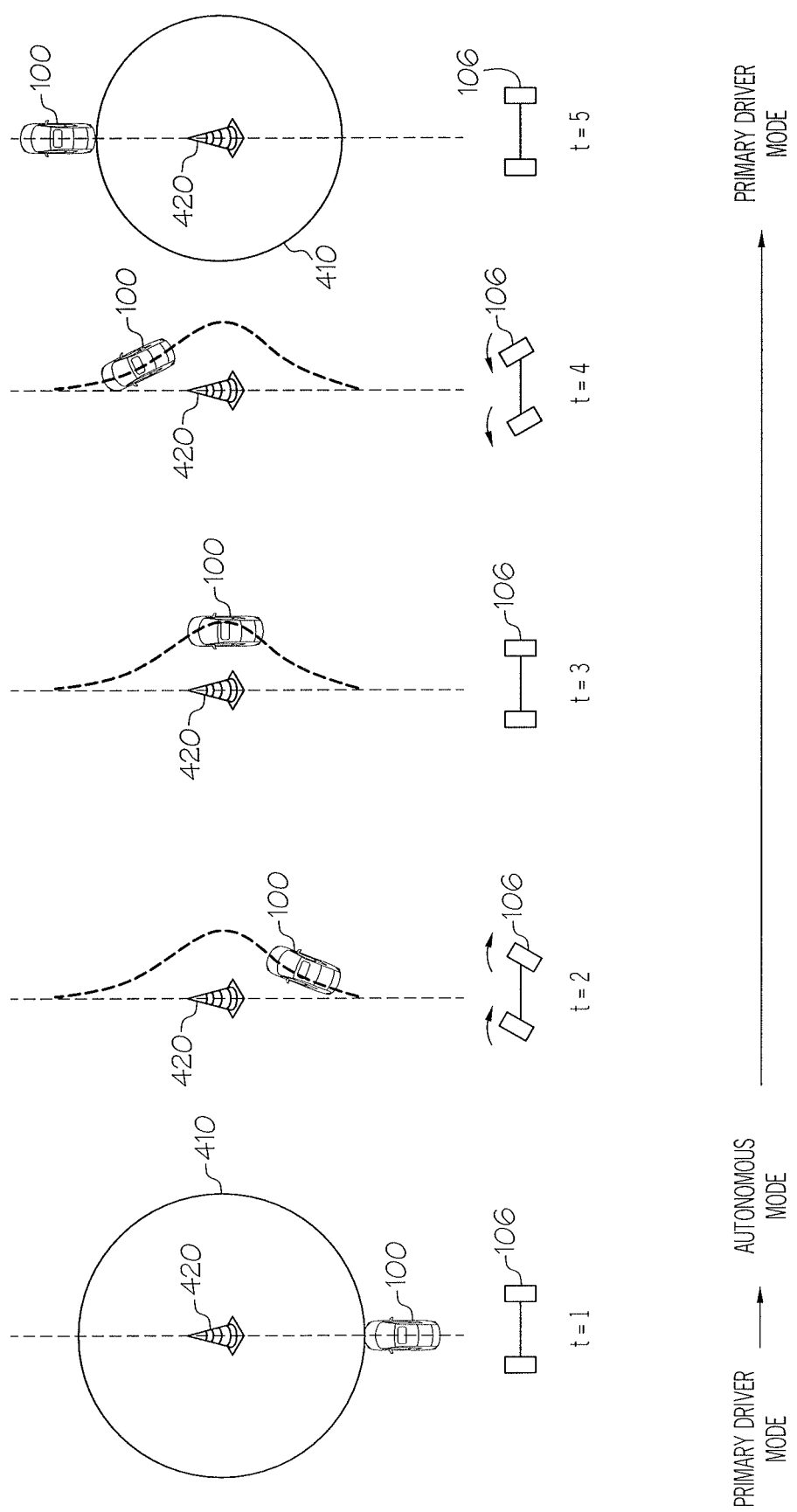
FIG. 4 depicts switching operation modes of a vehicle according to one or more embodiments shown and described herein.

In block 320, the vehicle system 200 determines whether an autonomous take-over event occurs based on the vehicle environment information. In embodiments, the autonomous take-over event may be a detection of an obstacle proximate to the vehicle 100. For example, as shown in FIG. 4, at time t=1, the vehicle 100 detects an obstacle 420 by sensors, for example, the one or more cameras 270, the one or more proximity sensors 276, etc. When the vehicle 100 enters into a predetermined zone 410, an area within a predetermined distance from the obstacle 420, the vehicle system 200 may determine that an autonomous take-over event occurred.

Referring again to FIG. 3, in block 330, the vehicle system 200 operates the vehicle 100 in the autonomous driving mode in response to determining that the autonomous takeover event occurred. In embodiments, the controller 202 and/or the autonomous controller 230 may send an instruction to the intervention switch 236 to switch such that the autonomous controller 230 can send control signals the steering ECU 240, the brake ECU 250, and/or the acceleration ECU 260 in the autonomous mode. For example, as shown in FIG. 4, at time t=1, the vehicle system 200 initiates the autonomous driving mode in response to determining that the vehicle 100 enters the predetermined zone 410. The vehicle system 200 may provide a notification that the autonomous driving mode has been initiated to the primary driver 102 by, e.g., outputting an alert voice message by the speaker 278, displaying an alert message on the screen 274, etc. During the autonomous driving mode, the autonomous controller 230 controls the operations of the vehicle 100. For example, as shown in FIG. 4, the autonomous controller 230 controls the front wheels 106 of the vehicle 100 between t=1 and t=4 to drive around the obstacle 420 in a precise and efficient way.

In some embodiments, when the vehicle system 200 determines that the autonomous take-over event ends, the vehicle system 200 terminates the autonomous driving mode and returns to the primary driver mode. For example, as shown in FIG. 4, when the vehicle 100 drives out of the predetermined zone 410, the vehicle system 200 terminates the autonomous driving mode and returns to the primary driver mode. The vehicle system 200 may provide a notification that the autonomous driving mode is about to be terminated to the primary driver 102 by, e.g., outputting an alert voice message by the speaker 278, displaying an alert message on the screen 274, etc.

Referring again to FIG. 3, in block 340, the vehicle system 200 determines whether the vehicle system 200 receives a take-over signal from a second output device. In embodiments, the vehicle system 200 determines whether the vehicle system 200 receives an output signal from the secondary driver system 220. For example, any time between t=1 and t=5 in FIG. 4, the vehicle system 200 determines whether the vehicle system 200 receives an output signal from the second steering wheel 120, the second accelerator pedal 122, and/or the second brake pedal 124 of the secondary driver system 220.

In block 350, the vehicle system 200 operates the vehicle 100 based on the second output from the second output device in response to determining that the vehicle system 200 received the take-over signal from the second output device. For example, if the vehicle system 200 receives an output from the second steering wheel 120 at time t=4 in FIG. 4, the vehicle 100 is then operated under the control of the secondary driver 104. In this example, the operation mode of the vehicle 100 is switched from the autonomous driving mode to the secondary driver mode. As another example, if the vehicle system 200 receives an output from the second steering wheel 120 at time t=1 in FIG. 4, the vehicle 100 is then operated under the control of the secondary driver 104. In this example, the operation mode of the vehicle 100 is switched from the primary driver mode to the secondary driver mode.

Figure 5:
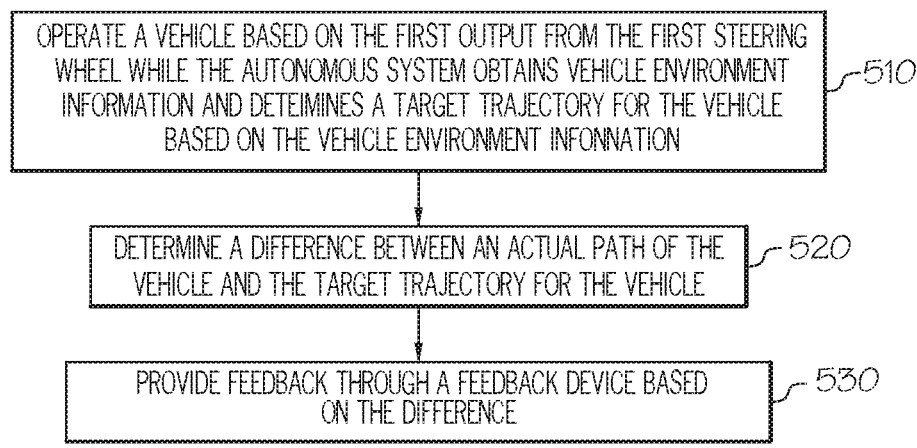
FIG. 5 depicts a flowchart for providing a feedback to a driver according to one or more embodiments shown and described herein.
Figure 6:
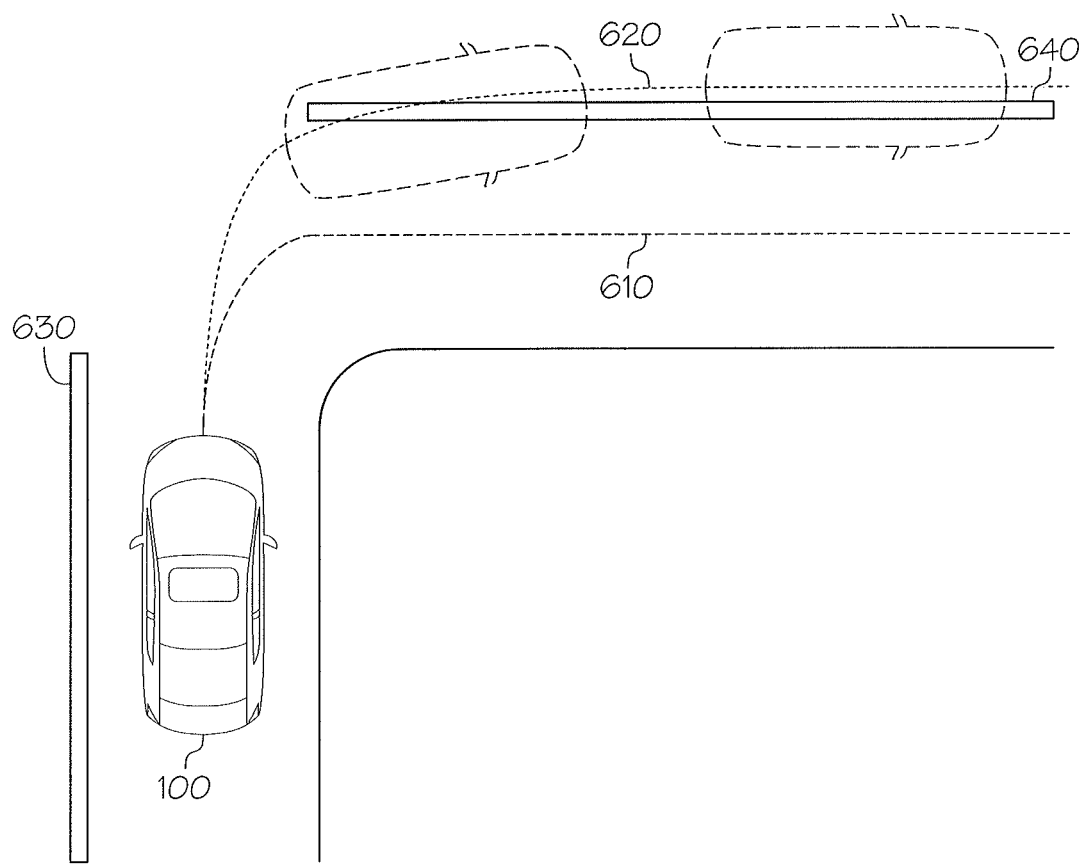
FIG. 6 depicts a driving path of a vehicle and a target trajectory, according to one or more embodiments shown and described herein.

FIG. 5 depicts a flowchart for providing a feedback to the primary driver according to one or more embodiments shown and described herein. In block 510, the vehicle system 200 operates the vehicle 100 based on the first output from the first steering wheel while the autonomous controller 230 obtains vehicle environment information and determines a target trajectory for the vehicle 100 based on the vehicle environment information. The autonomous controller 230 obtains vehicle environment information from various sensors including e.g., the one or more cameras 270, the one or more proximity sensors 276, and the one or more environment sensors 277. For example, the autonomous controller 230 may obtain information about the locations of the road lane markings 630 and 640 in FIG. 6. Based on the locations of the road lane markings 630 and 640, the autonomous controller 230 determines a target trajectory 610 for the vehicle 100.

Referring again to FIG. 5, in step 520, the vehicle system 200 determines a difference between an actual path of the vehicle 100 and the target trajectory for the vehicle 100. For example, the vehicle system 200 compares the actual path 620 of the vehicle 100 and the target trajectory 610 for the vehicle 100 shown in FIG. 6, and calculates a difference between the two trajectories. The difference may be calculated as a deviation of the actual path 620 from the target trajectory 610.

Referring again to FIG. 5, in step 530, the vehicle system 200 provides a feedback through a feedback device based on the difference. In embodiments, referring to FIG. 6, when the actual path 620 is deviated from the target trajectory 610 by a threshold amount, the controller 202 may instruct the steering wheel interface module 112 to vibrate the first steering wheel 110 in order to notify the primary driver 102 of the deviation. In some embodiments, the screen 274 may display an arrow in a clockwise direction to instruct the primary driver to further rotate the first steering wheel 110 such that the vehicle 100 is directed back to the target trajectory 610. In some embodiments, the controller 202 may instruct the speaker 278 to output a voice message, e.g., "Steer the steering wheel to the right further."

Figure 7:
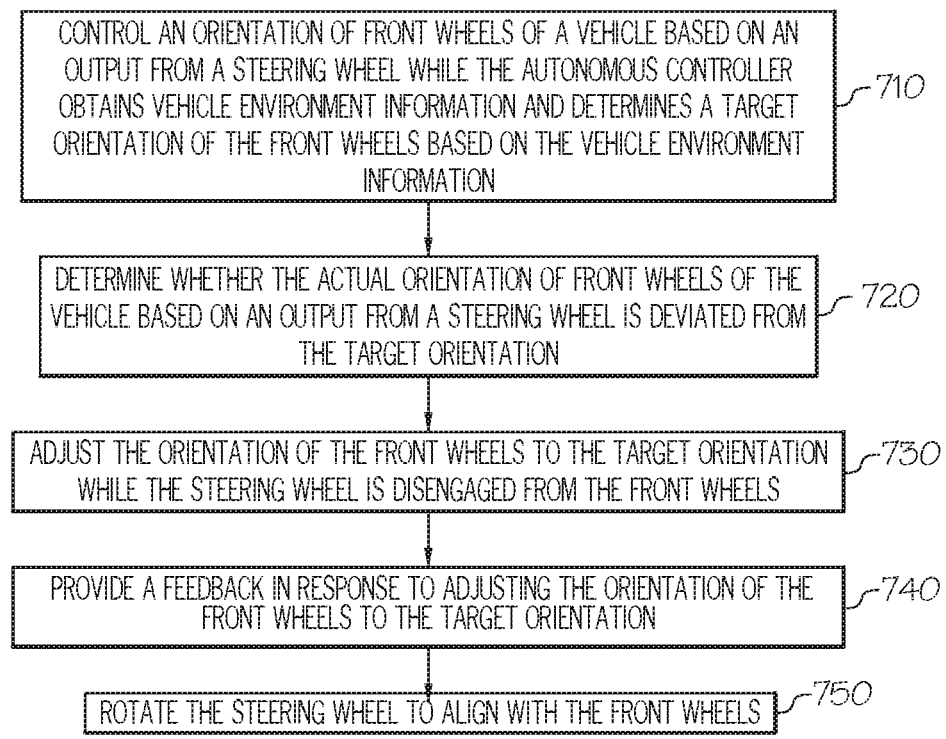
FIG. 7 depicts a flowchart for disengaging a steering wheel from the front wheels of a vehicle when an autonomous driving mode is initiated, according to one or more embodiments shown and described herein.
Figure 8A:
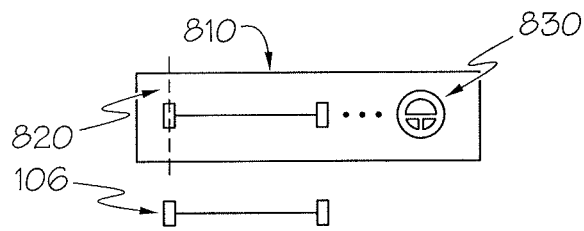
FIG. 8A depicts a virtual variable impedance disengagement mechanism between a steering wheel and front wheels, according to one or more embodiments shown and described herein.
Figure 8A:
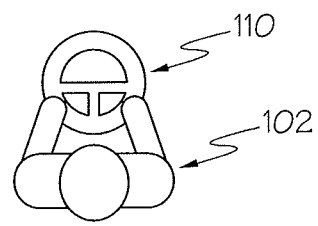

FIG. 7 depicts a flowchart for disengaging a steering wheel from the front wheels of a vehicle when an autonomous driving mode is initiated, according to one or more embodiments shown and described herein. In embodiments, in block 710, the vehicle system 200 controls an orientation of the front wheels 106 of the vehicle 100 based on an output from the first steering wheel 110 while the autonomous controller 230 obtains vehicle environment information and determines a target orientation of the front wheels 106 based on the vehicle environment information. For example, as shown in FIG. 8A, the vehicle system 200 controls the orientation of the front wheels 106 based on the control of the first steering wheel 110 by the primary driver 102. At the same time, the autonomous controller 230 obtains vehicle environment information and determines a target orientation of the front wheels 106 based on the vehicle environment information. In FIG. 8A, the target orientation 820 aligns with the actual orientation of the front wheels 106. In some embodiments, the autonomous controller 230 may simulate a virtual steering wheel 830 which aligns with the target orientation 820 of the front wheels 106 in FIG. 8A.

Figure 8B:
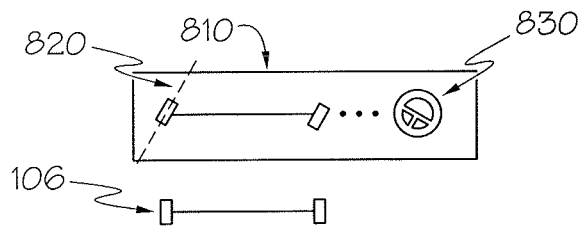
FIG. 8B depicts a virtual variable impedance disengagement mechanism between a steering wheel and front wheels, according to one or more embodiments shown and described herein.
Figure 8B:
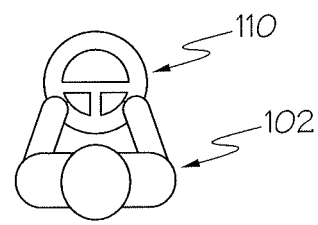

Referring again to FIG. 7, in block 720, the vehicle system 200 determines whether the actual orientation of front wheels 106 of the vehicle 100 is deviated from the target orientation of the front wheels 106. In embodiments, the vehicle system 200 determines whether the actual orientation of front wheels 106 of the vehicle 100 based on the output from the first steering wheel 110 shown in FIG. 1A or 1B is deviated from the target orientation of the front wheels 106. For example, in FIG. 8A, the actual orientation of the front wheels 106 is the same as the target orientation 820 of the front wheels 106. In FIG. 8B, the target orientation 820 is rotated clockwise from a vehicle driving direction. For example, when the autonomous controller 230 detects the obstacle 420 based on the vehicle environment information at time t=1 in FIG. 4, the target orientation 820 of the front wheels 106 is rotated clockwise from a vehicle driving direction. At this moment, the primary driver 102 may not rotate the first steering wheel 110 clockwise, and the actual orientation of the front wheels 106 may be deviated from the target orientation 820 of the front wheels 106 as shown in FIG. 8B. In some embodiments, the vehicle system 200 may determine whether the virtual steering wheel 830 is deviated from the first steering wheel 110.

Figure 8C:
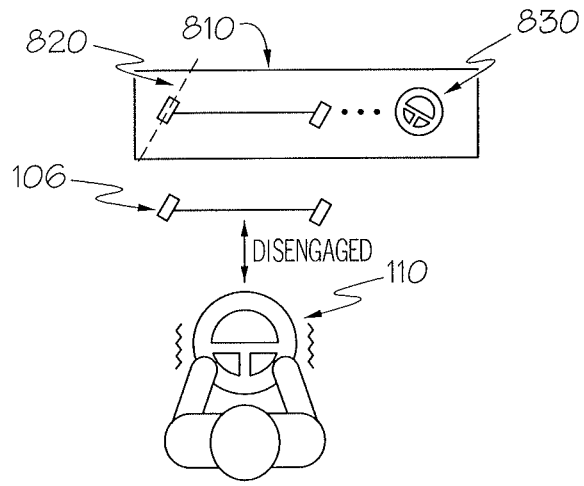
FIG. 8C depicts a virtual variable impedance disengagement mechanism between a steering wheel and front wheels, according to one or more embodiments shown and described herein.

Referring again to FIG. 7, in block 730, the vehicle system 200 adjusts the orientation of the front wheels 106 to the target orientation 820 while the first steering wheel 110 is disengaged from the front wheels 106. This is a virtual variable impedance disengagement mechanism which allows the autonomous controller 230 to rapidly take over the control from the primary driver 102 and control the front wheels 106 when the primary driver 102 fails to swiftly manipulate the first steering wheel 110. For example, in FIG. 8C, the controller 202 and/or the autonomous controller 230 rotate the front wheels 106 clockwise from the vehicle driving direction in order to align the actual orientation of the front wheels 106 with the target orientation 820. At this time, the first steering wheel 110 may not rotate according to the orientation change of the front wheels 106, and thus may be virtually disengaged from the front wheels 106.

In some embodiments, the first steering wheel 110 is totally disengaged from the front wheels, and the autonomous controller 230 controls the vehicle 100 under the autonomous driving mode. In another embodiment, when the first steering wheel 110 is virtually disengaged from the front wheels 106, the primary driver 102 may still partially control the orientation of the front wheels 106 by rotating the first steering wheel 110. For example, in FIG. 8C, if the primary driver 102 rotates the first steering wheel 110 counter-clockwise, the orientation of the front wheels 106 may be rotated counter-clockwise from a vehicle driving direction based on the rotation of the first steering wheel 110 by the primary driver 102.

Referring again to FIG. 7, in block 740, the vehicle system 200 provides feedback in response to adjusting the orientation of the front wheels to the target orientation. In embodiments, the vehicle system 200 may provide a haptic feedback to the primary driver 102. For example, the steering wheel interface module 112 may provide a vibration to the first steering wheel 110 such that the primary driver 102 can feel the initiation of the autonomous driving mode. The steering wheel interface module 112 may provide a vibration to the right portion of the first steering wheel 110 such that the primary driver 102 can feel that the autonomous driving mode rotates the front wheels 106 to the right side. As another example, the steering wheel interface module 112 may provide a torque in a clockwise direction which may not overcome a counter-torque applied to the first steering wheel 110 by the primary driver 102. In some embodiments, the torque provided by the steering wheel interface module 112 may be proportional to a degree of the difference between the orientation of the first steering wheel 110 and the orientation of the virtual steering wheel 830. For example, as the difference between the orientation of the first steering wheel 110 and the orientation of the virtual steering wheel 830 becomes greater, the torque provided by the steering wheel interface module 112 becomes greater such that the primary driver 102 feels that she needs to rotate the first steering wheel 110 along the direction of the torque.

In some embodiments, the vehicle system 200 may provide an audible feedback to the primary driver 102. For example, the speaker 278 may output a voice message e.g., "Autonomous driving mode is on," in response to adjusting the orientation of the front wheels to the target orientation. In some embodiments, the vehicle system 200 may provide a visual feedback to the primary driver 102. For example, the screen 274 may display an alert message, e.g., "Autonomous driving mode is on."

Figure 8D:
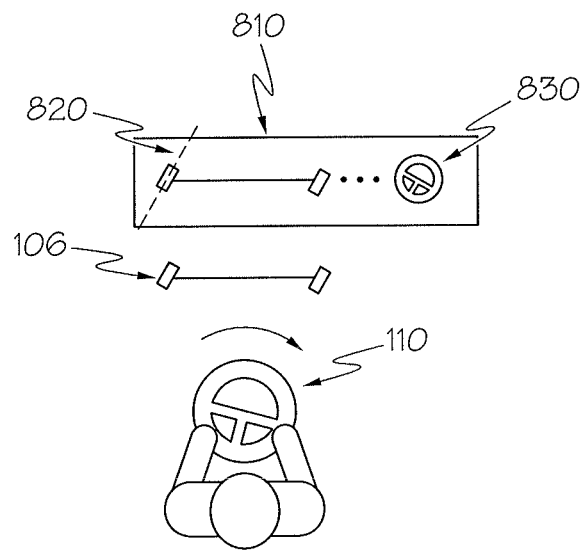
FIG. 8D depicts a virtual variable impedance disengagement mechanism between a steering wheel and front wheels, according to one or more embodiments shown and described herein.

Referring again to FIG. 7, in block 750, the vehicle system 200 rotates the first steering wheel 110 to align with the front wheels. FIG. 8D depicts the rotation of the first steering wheel 110 to be aligned with the front wheels 106. In embodiments, the steering wheel interface module 112 slowly rotates the first steering wheel 110 clockwise until the first steering wheel 110 is aligned with the front wheels 106. For example, when the primary driver 102 releases the first steering wheel 110, the steering wheel interface module 112 slowly rotates the first steering wheel 110 clockwise until the first steering wheel 110 is aligned with the front wheels 106. As another example, the steering wheel interface module 112 may apply a torque that overcomes the counter-torque by the primary driver 102 such that the steering wheel interface module 112 slowly rotates the first steering wheel 110 clockwise until the first steering wheel 110 is aligned with the front wheels 106.

Figure 8E:
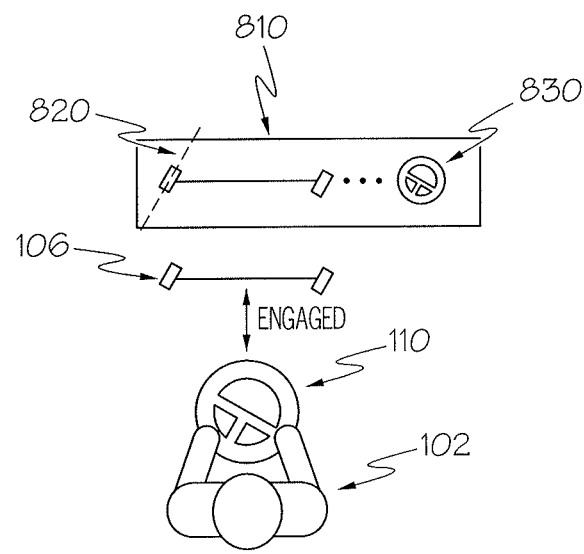
FIG. 8E depicts a virtual variable impedance disengagement mechanism between a steering wheel and front wheels, according to one or more embodiments shown and described herein.

In some embodiments, the steering wheel interface module 112 rotates the first steering wheel 110 clockwise until the first steering wheel 110 is aligned with the virtual steering wheel 830. FIG. 8E depicts the completion of alignment between the first steering wheel 110 with the front wheels 106. The first steering wheel 110 is now fully engaged with the front wheels 106, and the primary driver 102 may switch from the autonomous driving mode to the primary driver mode.

The virtual variable impedance disengagement mechanism described in FIGS. 7 and 8A-8E may be implemented not only in the dual cockpit system of FIG. 1A, but also in the single wheel system of FIG. 1B.

A vehicle system for operating a vehicle in different modes is provided. The vehicle system includes a first output device configured to output a first output based on an input from a first user, a second output device configured to output a second output based on an input from a second user. The vehicle system also includes one or more processors, one or more memory modules communicatively coupled to the one or more processors, and machine readable instructions stored in the one or more memory modules that, when executed by the one or more processors, cause the vehicle system to operate a vehicle based on the first output from the first output device while obtaining vehicle environment information, determine whether an autonomous take-over event occurs based on the vehicle environment information, operate the vehicle in an autonomous driving mode in response to determining that the autonomous takeover event occurred, determine whether the vehicle system receives a take-over signal from the second output device, and operate the vehicle based on the second output from the second output device in response to determining that the vehicle system received the take-over signal from the second output device.

According to the present subject matter, because the autonomous controller obtains vehicle environment information while the vehicle is under the control of the primary driver, and immediately takes the control over from the primary driver in response to the occurrence of an autonomous take-over event, the vehicle system guides the primary driver to an optimal path. In addition, with the help of the virtual variable impedance disengagement, the vehicle may swiftly drive around an obstacle even when the primary driver holds the steering wheel tight without rotating the steering wheel. Furthermore, the vehicle system allows a secondary driver to take the control over in case the primary driver driving or the autonomous driving is not proper at the secondary driver's discretion.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle system comprising:
a first output device configured to output a first output based on an input from a first user;
a second output device configured to output a second output based on an input from a second user;
one or more processors;
one or more memory modules communicatively coupled to the one or more processors; and
machine readable instructions stored in the one or more memory modules that cause the vehicle system to perform at least the following when executed by the one or more processors:
operate a vehicle based on the first output from the first output device while obtaining vehicle environment information;
determine whether an autonomous take-over event occurs based on the vehicle environment information;
operate the vehicle in an autonomous driving mode in response to determining that the autonomous take-over event occurred;
determine whether the vehicle system receives a take-over signal from the second output device; and
operate the vehicle based on the second output from the second output device in response to determining that the vehicle system received the take-over signal from the second output device.

2. The vehicle system of claim 1, wherein the first output device is a first steering wheel, and wherein the second output device is a second steering wheel.

3. The vehicle system of claim 1, wherein the machine readable instructions stored in the one or more memory modules cause the vehicle system to provide a feedback to the first user in response to determining that the autonomous take-over event occurred.

4. The vehicle system of claim 3, wherein the feedback includes a haptic feedback provided through the first output device.

5. The vehicle system of claim 1, wherein the first output device is a first brake pedal, wherein the second output device is a second brake pedal.

6. The vehicle system of claim 1, wherein the vehicle environment information includes at least one of a status of a driver, a presence of an external obstacle, an operating state of the vehicle, and traffic information.

7. The vehicle system of claim 1, wherein the autonomous take-over event includes the vehicle entering a predetermined zone.

8. A vehicle system comprising:
a first steering wheel configured to output a first output based on an input from a first user;
a second steering wheel configured to output a second output based on an input from a second user;
one or more processors;
one or more memory modules communicatively coupled to the one or more processors; and
machine readable instructions stored in the one or more memory modules that cause the vehicle system to perform at least the following when executed by the one or more processors:
operate a vehicle based on the first output from the first steering wheel while obtaining vehicle environment information;
determine whether an autonomous take-over event occurs based on the vehicle environment information or determine whether the vehicle system receives a take-over signal from the second steering wheel; and
operate the vehicle in an autonomous mode or operate the vehicle based on the second output from the second steering wheel in response to determining that the vehicle system received the take-over signal from the second steering wheel.

9. The vehicle system of claim 8, wherein the machine readable instructions stored in the one or more memory modules cause the vehicle system to:
determine a target trajectory for the vehicle based on the vehicle environment information;
determine a difference between an actual path of the vehicle and the target trajectory for the vehicle; and
provide a feedback through a feedback device based on the difference.

10. The vehicle system of claim 9, wherein the machine readable instructions stored in the one or more memory modules cause the vehicle system to:
determine whether the actual path is deviated from the target trajectory by a threshold amount; and
provide the feedback through the feedback device in response to determination that the actual path is deviated from the target trajectory by the threshold amount.

11. The vehicle system of claim 9, wherein the feedback includes an audible feedback explaining the difference.

12. The vehicle system of claim 9, wherein the feedback includes a visual feedback indicating the difference.

13. The vehicle system of claim 9, wherein the vehicle environment information includes at least one of a status of a driver, a presence of an external obstacle, an operating state of the vehicle, or traffic information.

14. A vehicle system comprising:
a first steering wheel configured to output an output based on an input from a user;
a second steering wheel configured to output a second output based on an input from a second user;

one or more processors;

one or more memory modules communicatively coupled to the one or more processors; and machine readable instructions stored in the one or more memory modules that cause the vehicle system to perform at least the following when executed by the one or more processors:

control an orientation of front wheels of a vehicle based on the output from the first steering wheel while obtaining vehicle environment information;

determine whether an autonomous take-over event occurs based on the vehicle environment information or determine whether the vehicle system receives a take-over signal from the second steering wheel; and operate the vehicle in an autonomous mode or operate the vehicle based on the second output from the second steering wheel in response to determining that the vehicle system received the take-over signal from the second steering wheel.

15. The vehicle system of claim 14, wherein the machine readable instructions stored in the one or more memory modules cause the vehicle system to:

determine a target orientation of front wheels based on the vehicle environment information;

determine whether the orientation of the front wheels of the vehicle based on the output from the first steering wheel deviates from the target orientation;

adjust the orientation of the front wheels to the target orientation while the first steering wheel is disengaged from the front wheels;

provide a feedback in response to adjusting the orientation of the front wheels to the target orientation; and rotate the first steering wheel to align with the front wheels.

16. The vehicle system of claim 15, wherein the feedback includes a vibration on a portion of the first steering wheel.

17. The vehicle system of claim 15, wherein the feedback includes a haptic feedback provided through the first steering wheel.

18. The vehicle system of claim 15, wherein the feedback includes a rotational torque applied to the first steering wheel.

19. The vehicle system of claim 18, wherein the rotational torque is determined based on a difference between an orientation of the first steering wheel and the orientation of the front wheels.

20. The vehicle system of claim 9, wherein the feedback device includes at least one of a steering wheel interface module, a speaker, and a display.

* * * * *